UNITED STATES PATENT OFFICE.

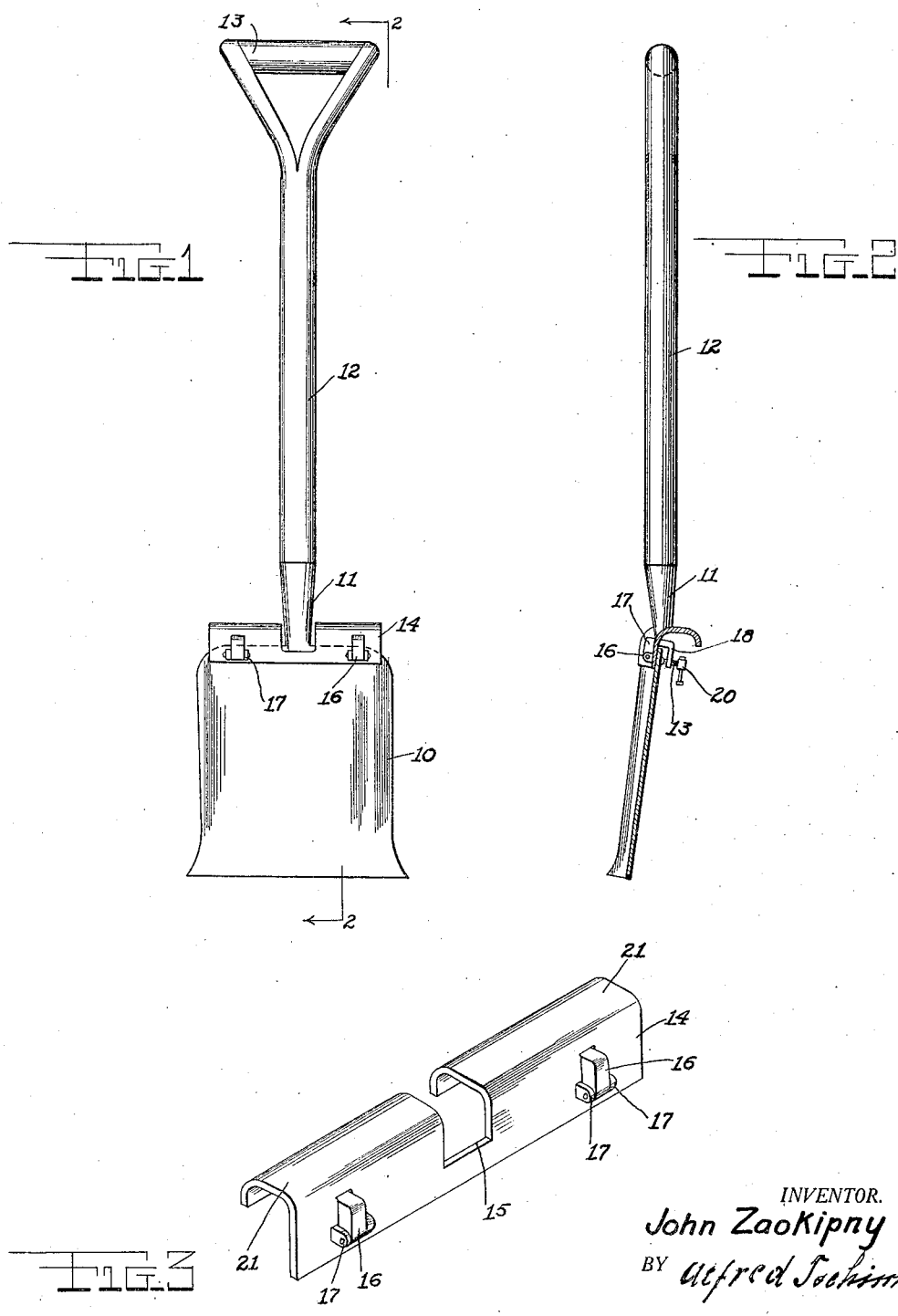

JOHN ZAOKIPNY, OF BAIRD, ONTARIO, CANADA.

SHOVEL ATTACHMENT.

1,346,870. Specification of Letters Patent. Patented July 20, 1920.

Application filed November 7, 1919. Serial No. 336,466.

*To all whom it may concern:*

Be it known that I, JOHN ZAOKIPNY, a citizen of Ukrainia, residing at Baird, Province of Ontario, and Dominion of Canada, have invented certain new and useful Improvements in Shovel Attachments, of which the following is a specification.

This invention relates to certain new and useful improvements in shovels and principally that class which are employed to lift and throw earth and comprising a scoop or a flat blade with a handle.

The invention has for its object to improve devices of this character in respect to the upper edge of said shovel blade by providing an attachment whereby said upper edge is prevented from injuring the shoes of a digger.

With the above and other objects in view the invention consists in the novel construction, combination, and arrangement of parts, to be hereinafter more fully described and specifically pointed out in the claims.

In describing my invention in detail reference is had to the accompanying drawing forming a part of this specification, and wherein like numerals of reference indicate like parts throughout the several views, in which—

Figure 1 is a front view of a shovel provided with the attachment according to the present invention.

Fig. 2 is a side view thereof partly in section on line 2—2 of Fig. 1, and

Fig. 3 is a perspective view of the shovel attachment.

To the upper edge of a shovel 10 provided with the customary ferrule 11 for the reception of a handle 12 having at its upper end a grip 13, an element 14 is attached for saving the shoes of a digger from injury by bending and cutting.

This element 14 consists of a body, L-shaped in cross-section, having a recess 15 in its center for the reception of the ferrule 11, and to both sides of the recess 15 in approximately the neighborhood of the ends of said element, links 16 are pivotally secured between ears 17 and 17 to the front part of said element 14. These links 16 are passed through the material of the element 14 to the rear thereof and are there rectangularly bent as shown at 18, in Fig. 2. A fastening means comprising a screw 19 and operating lever 20 passed through the bend 18, is provided to clamp the element 14 against the rear face of the shovel or blade 10.

From the foregoing description it will be clear that a person using the shovel will engage with his feet the comparatively wide shoulder 21 of the attachment 14, which will save the shoes from bending and protect the same against cutting by the sharp upper edge of the shovel blade.

In practice it will be observed that various changes may be made in the details of construction without departing from the general spirit of my invention.

Having thus described my invention what I claim as new and desire to secure by Letters Patent is—

1. A shovel attachment of the character described comprising a recessed body, L-shaped in cross-section adapted to grip over the upper edge of a shovel blade, links pivoted to the front side of said attachment, and means for securing said links against said shovel.

2. A shovel attachment of the character described comprising a body, L-shaped in cross-section, and recessed in its center, a comparatively wide upper shoulder on said body, ears at the front part of said body, means pivotally connected to said ears to hold said atttachment in position on a shovel blade, and means for locking the parts in this position.

3. A shovel attachment of the character described comprising a body L-shaped in cross-section and recessed in its center for the passage of the shovel ferrule, two wide, upper shoulders in said body to both sides of the recess, ears secured to the front face of said attachment, links pivotally secured between said ears and passed through said body, a rectangular bend in said links at the rear of said shovel, and a screw and handle for securing said links and attachment to said shovel substantially as described.

In testimony whereof I have affixed my signature.

JOHN ZAOKIPNY.